United States Patent [19]

Kumagai

[11] 3,900,115

[45] Aug. 19, 1975

[54] APPARATUS FOR SUPPLYING THIN, FLAT ARTICLES
[75] Inventor: Naoki Kumagai, Yokohama, Japan
[73] Assignee: Itogihan Company, Ltd., Tokyo, Japan
[22] Filed: Nov. 22, 1972
[21] Appl. No.: 308,820

[30] Foreign Application Priority Data
Nov. 24, 1971 Japan............................... 46-93613
Dec. 27, 1971 Japan............................. 46-105242
June 12, 1972 Japan............................... 47-57704
June 21, 1972 Japan............................... 47-61314
June 23, 1972 Japan............................... 47-62312

[52] U.S. Cl................. 214/1 Q; 214/6 C; 214/6 D; 214/8.5 A; 271/3.1; 271/146
[51] Int. Cl............................................ B65g 59/08
[58] Field of Search ...... 214/1 Q, 1 QE, 6 D, 6 DK, 214/6 H, 6 C, 6 P, 7, 8.5 R, 8.5 A, 6 A; 93/93 R, 93 C, 93 DP; 271/146, 3.1, DIG. 8, 149, 150, 3, 4, 6, 7, 8; 198/35

[56] References Cited
UNITED STATES PATENTS
| | | | |
|---|---|---|---|
| 2,776,831 | 1/1957 | Shields............................... | 214/6 C |
| 3,422,969 | 1/1969 | Miller et al. ....................... | 214/6 D |
| 3,643,939 | 2/1972 | Nussbaum et al................... | 214/6 C |
| 3,741,413 | 6/1973 | Friel................................. | 214/1 QE |

Primary Examiner—Robert J. Spar
Assistant Examiner—Leslie J. Paperner
Attorney, Agent, or Firm—Oblon, Fisher, Spivak, McClelland & Maier

[57] ABSTRACT

An apparatus for supplying stacked, thin, flat articles comprising a reversing means which reverses the direction toward which the articles face by rotating the articles about one of their side edges and a clearance making means which provides a plurality of clearance spaces between several pairs of article side edges while the articles are being reversed. The actuating position of the clearance making means is movably adjustable relative to the reversing means.

6 Claims, 17 Drawing Figures

APPARATUS FOR SUPPLYING THIN, FLAT ARTICLES

BACKGROUND OF THE INVENTION

The present invention relates generally to an apparatus for supplying thin, flat articles, and more particularly to an apparatus for supplying cardboards to machines which are used in various steps of making cartons from the cardboards.

Various machines have been developed for the making of cartons from cardboards. For example, machines have been developed for printing, cutting, and the like. But there is present a need for machines to automatically supply the cardboards to other processing machines. In many cases of supplying cardboards for the making of cartons, the reversal of the cardboards, from their stacked condition is necessary. Consequently, the cardboards are normally reversed and supplied to the machines from their piled condition by manual labor, a great deal of labor and cost therefore being consumed.

SUMMARY OF THE INVENTION

Accordingly, it is an object of this invention to provide an apparatus for supplying thin, flat articles, wherein the thin, flat articles, such as for example, cardboards, wood plates, metal plates or the like, can be automatically reversed and supplied from a stacked condition thereof, thus reducing the labor and cost involved in supplying thin, flat articles.

Another object of the present invention is to provide an apparatus for supplying thin, flat articles, wherein the articles are able to be fed, in proper sequential order commencing with the ones initially uppermost within the stack, subsequent to reversal.

The foregoing objectives are achieved according to this invention through the provision of an apparatus for supplying thin, flat articles comprising a reversing means which reverses piled articles by rotating the articles about one of their side edges and clearance making means which provides at least one clearance space between a pair of article side edges while the reversing means reverses the articles. The actuating position of the clearance means is adjustable relative to the reversing means. The reversing means includes at least one bottom surface supporting part for supporting the bottom surfaces of the piled articles and a plurality of edge supporting parts, disposed perpendicular to the bottom surface supporting parts, for supporting one of the side edges of the articles. The reversing means is thus able to lift and rotate the piled articles so as to reverse them while the clearance means properly spaces the articles, subsequent to which the edge supporting parts cooperate with conveyers which are able to receive the reversed articles and subsequently feed the articles to a processing machine. A guide means installed near one side of the articles and an aligning means installed near the opposite side of the articles, are provided for properly aligning the articles relative to one another and for subsequent guidance of such articles to the processing machinery.

BRIEF DESCRIPTION OF THE DRAWINGS

Various other objects, features, and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF A PREFERRED EMBODIMENT

Figure 1:
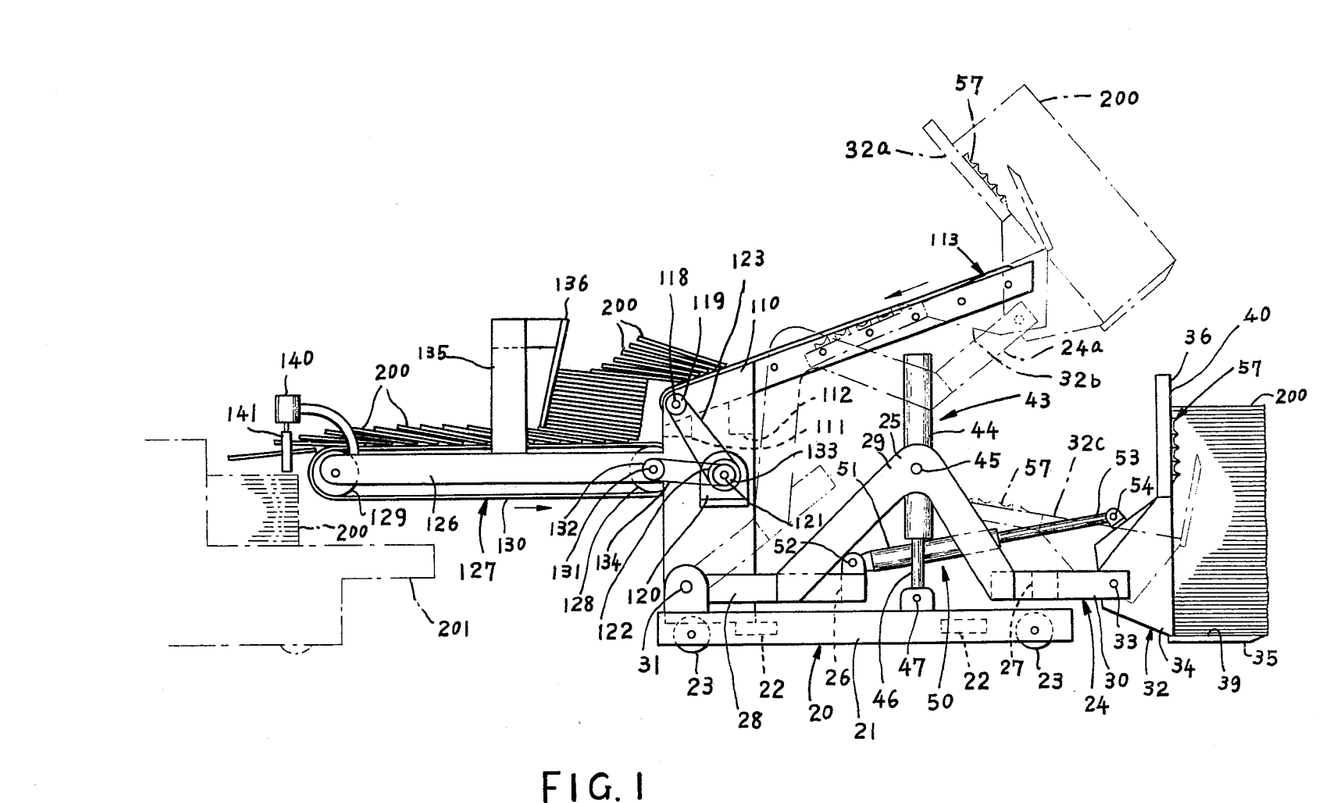
FIG. 1 is a side elevational view illustrating the apparatus incorporating the present invention.
Figure 2:
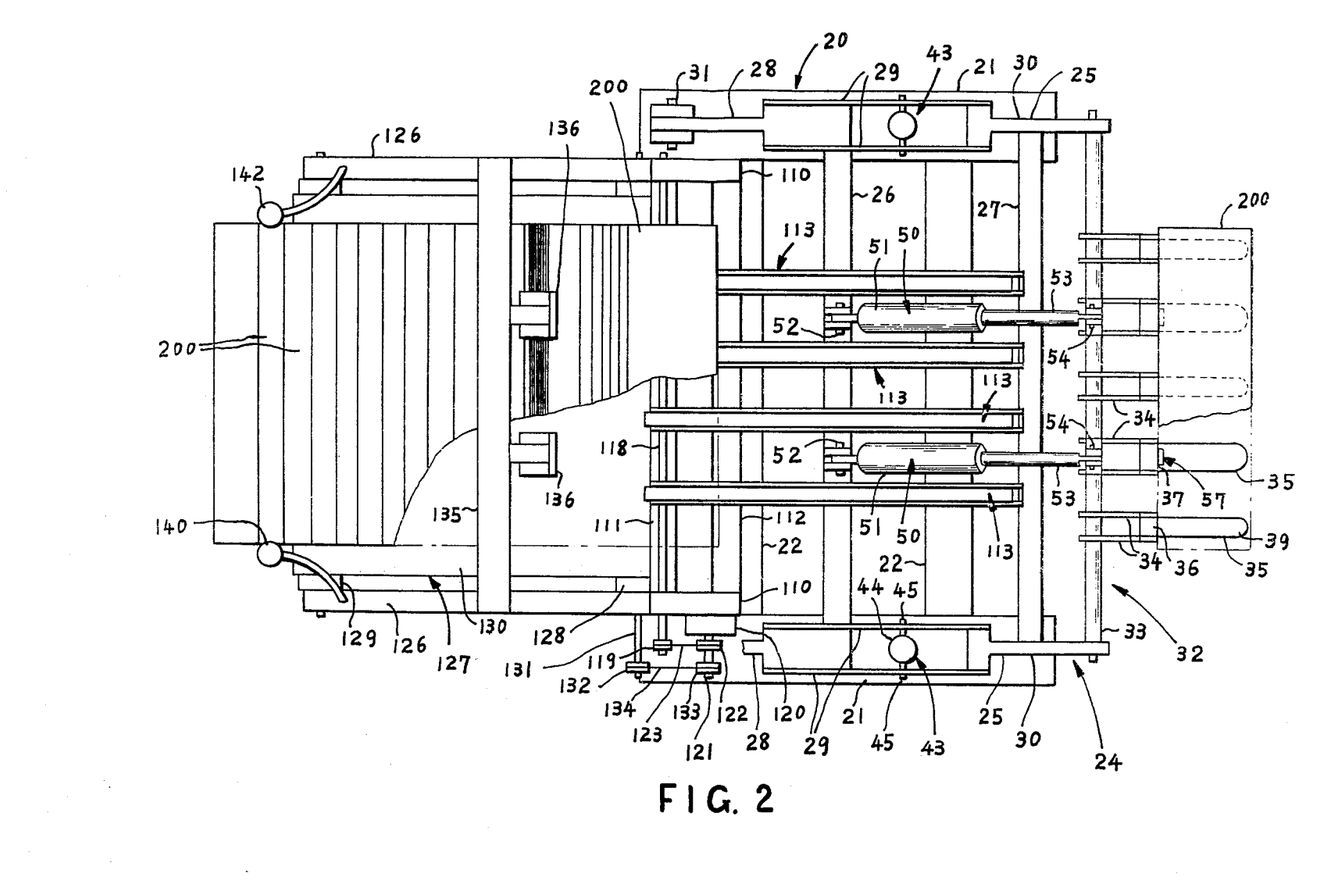
FIG. 2 is a plan view of the apparatus shown in FIG. 1.
Figure 3:
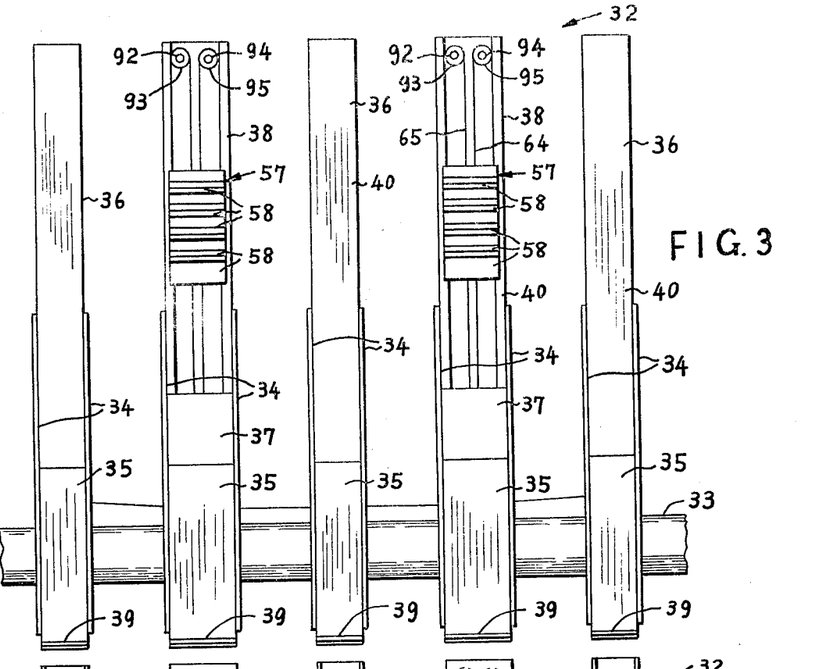
FIG. 3 is a front view of a reversing device utilized within the apparatus of the present invention.

Referring now to the drawings, and more particularly to FIGS. 1 and 2 thereof, there is shown an apparatus for supplying cardboards constructed according to this invention, the apparatus having a base generally indicated by the reference character 20 which includes a pair of side members 21 connected by a pair of transverse members 22, and each side member 21 has a pair of wheels 23 at both ends thereof so that the apparatus can move on rails, not shown.

An arm assembly generally indicated by the reference character 24 and disposed above base 20 also has a pair of arms 25 connected to each other by transversely extending members 26 and 27. Each arm 25 comprises a rear member 28, a pair of laterally spaced middle members 29 which are plates, and a front member 30. The rear member 28 is pivotally connected to the base 20 by means of a pin 31.

Referring now to FIGS. 1–6, the apparatus further includes a reversing device generally indicated by the reference character 32 which has a transverse member 33 pivotally supported at both ends within the front members 30 of the arm assembly 24, and five pairs of laterally spaced plate members 34. Five L-shaped members 35 are attached to each pair of plate members 34 respectively, the lower normally horizontally extending parts 39 of the L-shaped members 35 cooperating with each other so as to form a forked-shaped array for supporting cardboards 200. Three vertically extending pole members 36 are respectively attached to the side and central plate members 34 at the upper surfaces of the normally, vertically extending parts of the L-shaped members 35, each pole member 36 being channel-shaped having its rear portion open. Similarly, a pair of short channel-shaped members 37 are attached to those plate members 34, at the upper surfaces of the L-shaped members 35, which are located between the side and central members 34, vertically extending pole members 38 in turn being attached to the plate members 34 at the upper surfaces of the members 37. Each pole member 38 is channel-shaped having its front portion open, the front portions having flanged members bent inwardly so as to face each other.

In conjunction with the bottom surface supporting parts 39, edge supporting parts 40 are constructed from the vertically extending parts of the L-shaped members 35 and the respective pole members 36, and 37 and 38 which are of course disposed perpendicular to the bottom surface supporting parts 39 and adapted to support one of the side edges of the cardboards 200. The cardboards 200 may be brought to the reversing device 32 by means of a pallet, not shown, which may have corresponding grooves so as to receive the bottom surface supporting parts 39.

Referring again to FIGS. 1 and 2, there is also shown a first pair of hydraulic actuating devices generally indicated by the reference character 43 associated with arm assemblies 24, each of which has a vertically extending cylinder 44 to which a pair of hoses, not shown, are connected at both ends thereof for feeding and retracting pressurized oil. Each cylinder 44 is disposed between the middle members 29 of the arm 25 and is pivotally connected thereto by means of pins 45. A piston rod 46 is connected at its upper end to another piston, not shown, acting within the cylinder 44, the lower end of the piston rod 46 being pivotally connected to the base 20 by means of a pin 47.

A second pair of hydraulic actuating devices, generally indicated by the reference character 50, are also associated with arm assemblies 24, each device having a cylinder 51 to which a pair of hoses, not shown, are connected at both ends thereof for feeding and retracting pressurized oil, one end of the cylinder 51 being pivotally connected to the transverse member 26 by means of a pin 52. A piston rod 53, one end of which is connected to another piston, not shown, housed within the cylinder 51, is pivotally connected at its other end to one pair of plate members 34 by means of a pin 54.

After the cardboards 200 have been piled upon the reversing device 32, as shown in FIG. 1 in full lines, the arm assembly 24 is rotated to the position 24a by means of the oil pressure actuating devices 43, the reversing device 32 therefore be lifted and rotated to a position 32a thus transporting therewith the stacked cardboards 200. Subsequently, the reversing device 32 is rotated to the position 32b by means 50, the pressure actuating devices 60, the stacked cardboards 200 therefore being reversed about the side edge initially supported by edge supporting members 40, so as to face a direction opposite to the direction the cardboards initially faced prior to reversal. The reversed cardboards 200 are then removed from the reversing device 32, as will be more apparent hereinafter, after which the arm assembly 24 is returned to its first position by means of the oil pressure actuating devices 43, the reversing device 32 therefore attaining the position 32c. Finally, the reversing device 32 is returned to its initial position by means of the oil pressure actuating devices 50.

Referring now to FIGS. 3–5 and 7–10, an edge clearance making device generally indicated by the reference character 56 is installed upon the reversing device 32, and includes a pair of pantograph devices generally indicated by the reference character 57, each of which is respectively installed upon one of the pole members 38. Each pantograph device 57 has a plurality of acting members 58 having vertically extending grooves 59 along their side surfaces for facilitating sliding movement of the devices 57 along the flanged edges of the pole members 38. Each of the acting members 58, except the lowest one, has recess 60 along its front surface for engaging one side edge of the cardboards 200. A pair of links 62 are pivotally connected to each of the acting members 58 by means of a central pin 61 and are also pivotally connected to the next pair of links, at their respective tips, by means of pins 63. The edge clearance making device 56 also has a pair of flexible driving members or wire ropes 64 and 65, the lowest acting member 58 of each of the pantograph devices 57 being fixed to the wire rope 64 by means of a control member 66, while the uppermost acting member 58 of each of the pantograph devices 57 is fixed to the wire rope 65 by means of another control member 67.

Figure 4:
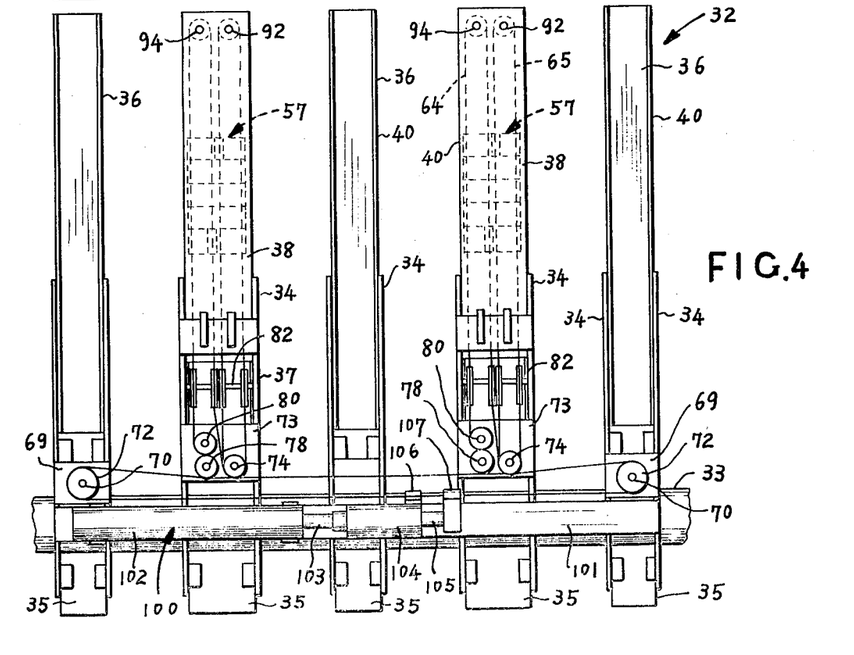
FIG. 4 is a rear view of the reversing device of FIG. 3.
Figures 5, 6:
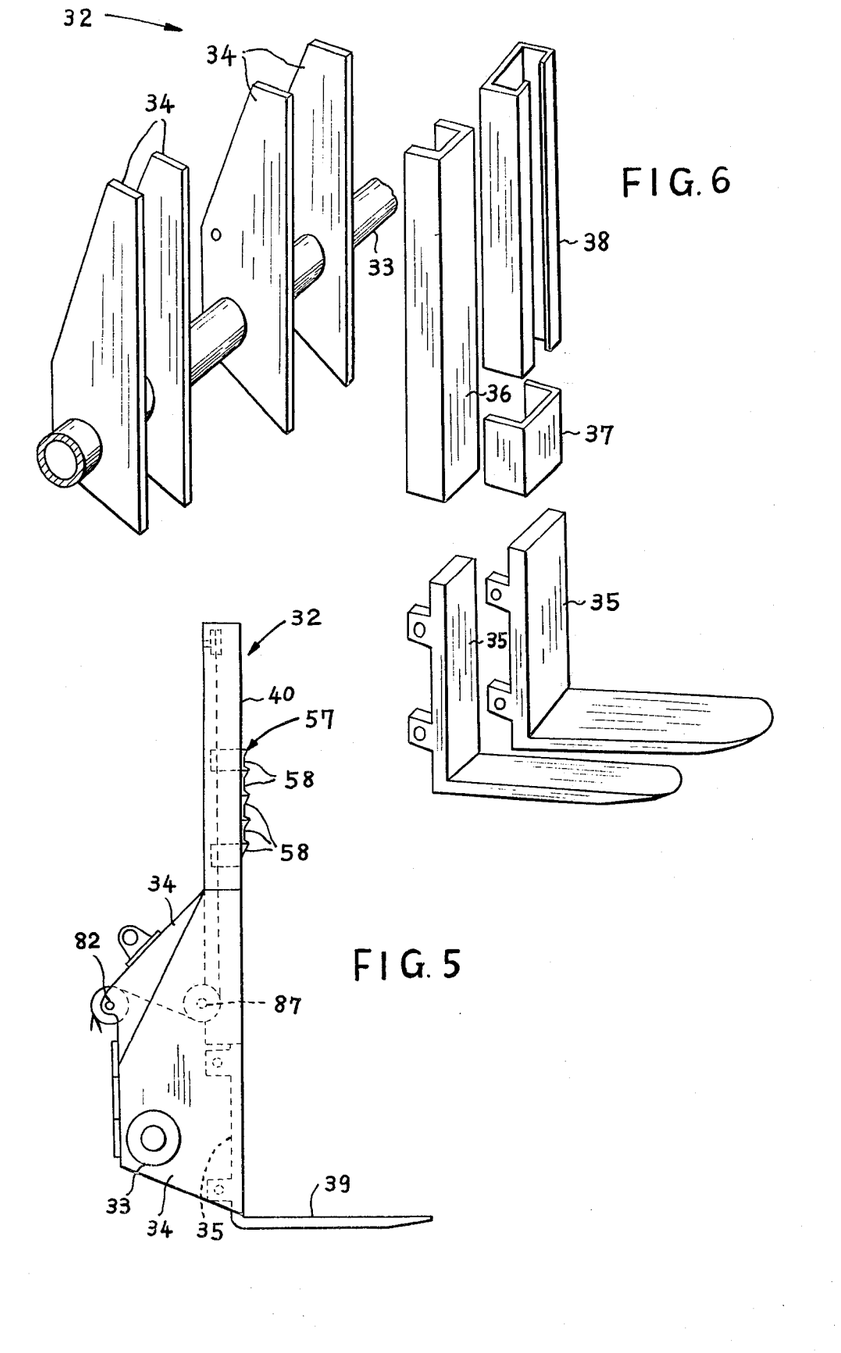
FIG. 5 is a side view of the reversing device of FIG. 3.
FIG. 6 is a fragmental and exploded perspective view of the reversing device of FIG. 3.
Figure 7:
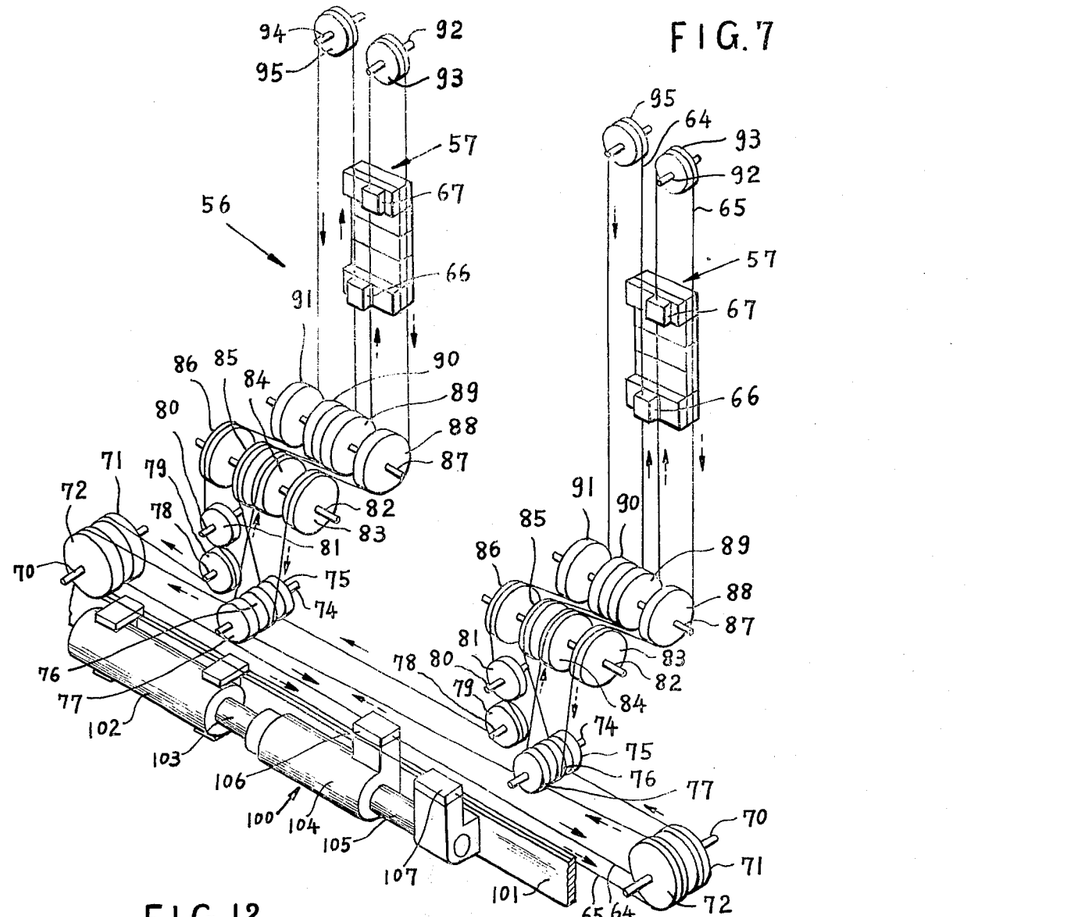
FIG. 7 is a perspective view of an edge clearance making device utilized in the apparatus of the present invention.
Figure 8:
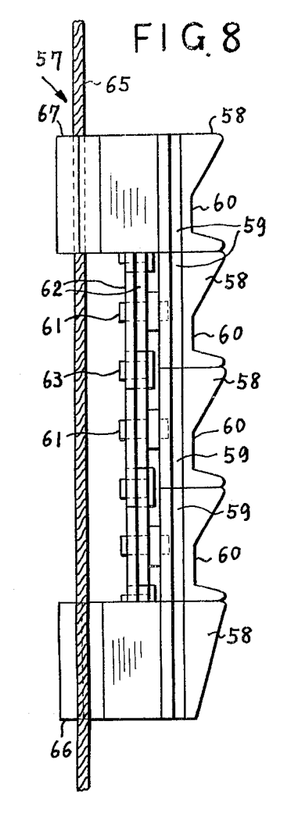
FIG. 8 is a side view of a pantograph device of the clearance making device of FIG. 7.
Figure 9:
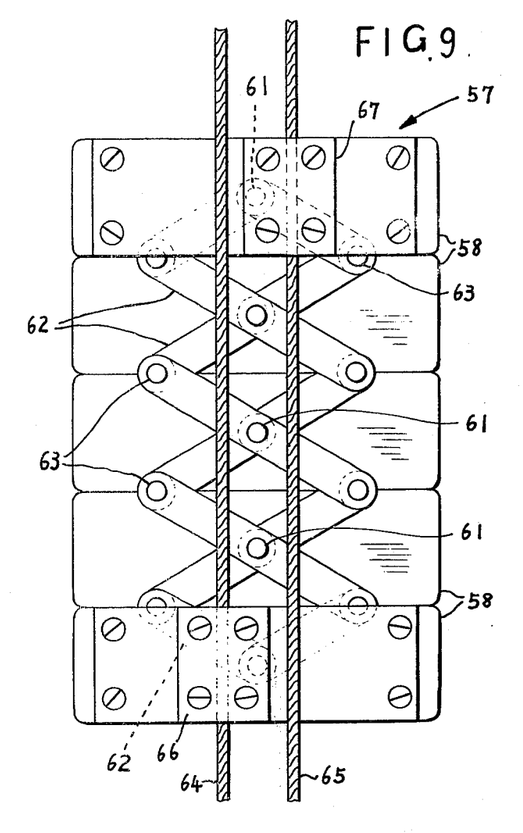
FIG. 9 is a rear view of the pantograph device of FIG. 8.
Figure 10:
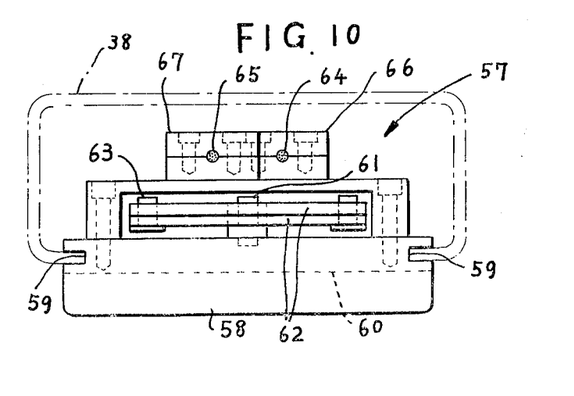
FIG. 10 is a plan view of the pantograph device of FIG. 8.

Referring particularly to FIGS. 4, 5 and 7, a pair of plate members 69 are respectively attached to the rear of the side plate members 34 of the reversing device 32. An axle 70 projects from each plate member 69 for rotatably supporting a pair of tandem groove wheels 71 and 72 thereon. Similarly, another pair of plate members 73 are respectively attached to the rear of the plate members 34 supporting the pole members 38, axles 74, 78 and 80 projecting therefrom. The axle 74 rotatably supports tandemly-arranged groove wheels 75, 76 and 77, while axles 78 and 80 rotatably support groove wheels 79 and 81 respectively. A pair of transversely extending axles 82 are fixed at both ends, to the plate members 34, at positions above the plate members 73, tandem groove wheels 83, 84, 85 and 86 being rotatably supported upon each axle 82. Similarly, another pair of transverse axles 87, fixed at both ends to the plate members 34, are positioned forwardly of each of the axles 82, respectively, groove wheels 88, 89, 90 and 91 being tandemly mounted upon each of the axles 87. Still another axle 92, provided with a groove wheel 93 rotatably supported thereon, as well as an axle 94 provided with a groove wheel 95 rotatably supported thereon project from the upper portion of each of the pole members 38.

Consequently, as seen in FIG. 7, the wire rope 64 is circuitously guided by the groove wheels 71, 75, 85, 90, 95, 91; 86, 81 and 79, while the wire rope 65 is likewise guided by the groove wheels 72, 77, 84, 89, 93, 88, 83 and 76. A hydraulic actuating device generally indicated by the reference character 100, for the driving of the wire ropes 64 and 65, has a first cylinder 102 mounted upon a beam 101 which is transversely fixed to the rear portions of plate members 34, and a second cylinder 104 fixed to one end of a piston rod 103 which is fixed at the other end to another piston, not shown, housed within the cylinder 102. The cylinder 104 is able to slide along the beam 101, and a piston rod 105, fixed at one end thereof to still another piston, not shown, housed within the cylinder 104, is also able to slide along the beam 101. The cylinder 104 is connected to the wire rope 64 by means of a control member 106, while the piston rod 105 is similarly connected to the wire rope 65 by means of another control member 107. Both sides of the cylinders 102 and 104 are connected to pressure oil sources by means of hoses, not shown, and consequently are able to feed or retract pressurized oil.

Figure 11A:
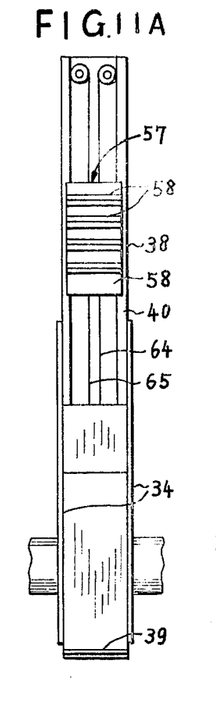
FIGS. 11A, 11B and 11C are front views illustrating the operation of the pantograph device of FIG. 8.
Figure 11B:
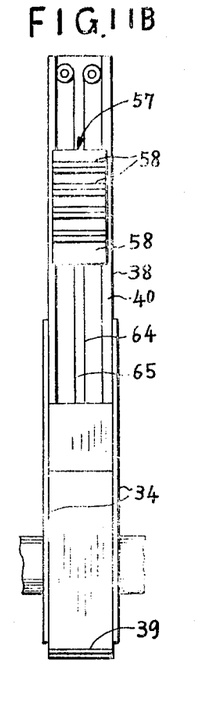
Figure 11C:
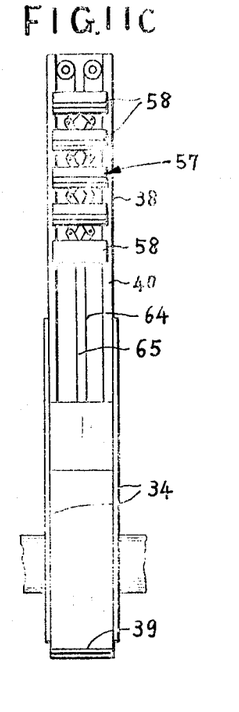

Referring to FIGS. 7, 11A, 11B, and 11C, the operation of the edge clearance making device 56 will now be described. When the piston rod 103 is projected from the cylinder 102 at the instance wherein no relative movement occurs between the cylinder 104 and the piston rod 105, that is, the pantograph devices 57 are contracted and positioned as shown in FIG. 11A, the wire ropes 64 and 65 are moved the same distance in the direction of the full line and dotted line arrows, respectively, as seen in FIG. 7 and therefore the pantograph devices 57 are raised the same distance at the same time from their same respective positions as shown in FIG. 11A to the positions shown in FIG. 11B. When, however, the piston rod 105 is projected from the cylinder 104 at the instance wherein the movement of piston rod 103 is terminated, only the wire rope 65 is moved in the direction of the dotted-line arrow shown in FIG. 7, whereupon the pantograph devices 57 are separated via the linkages 62, so that the distances between their respective acting members 58 are equal and the position of the lowest acting members are those just prior to separation, as shown in FIG. 11C. When the piston rod 105 is retracted, the pantograph devices 57 are of course contracted to the position shown in FIG. 11B from the condition as shown in FIG. 11C. Similarly, when the piston rod 103 is retracted, the pantograph devices 57 are lowered to the position shown in FIG. 11A.

In reversing the cardboards 200, it is necessary that the cardboards be fed, subsequent to reversal, in proper order commencing with the upper ones and proceeding to the lower ones as shown in the initial stacked condition of FIG. 1. However, a phenomena occurs at the moment of reversal of the cardboards, such that some of the initial lower cardboards become lapped upon, and project forwardly of the upper cardboards such that the cardboards cannot in fact be fed in the proper sequence. Through many experiments it has been ascertained that this phenomena can be removed by providing a plurality of clearances between the lower side edges of the cardboards when they are turned for reversal. Furthermore, it has been found that it is more effective if the clearances are provided between the edges of those cardboards which were initially disposed within the upper portion of the stack disposed upon the supporting members 39.

Figure 12:
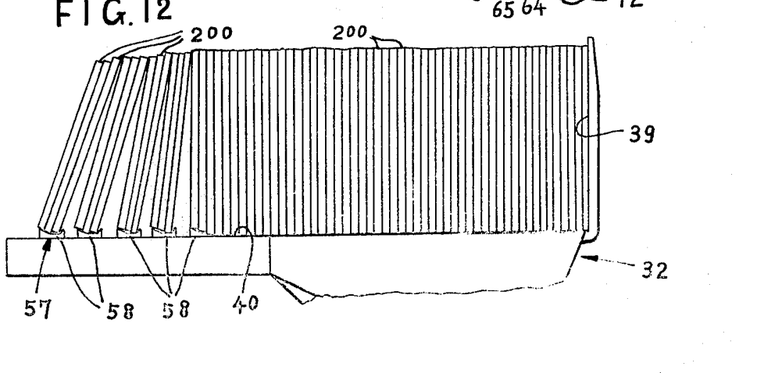
FIG. 12 is a side view of the cardboards while undergoing reversal, illustrating the clearances made between their lower side edges.
Figure 13:
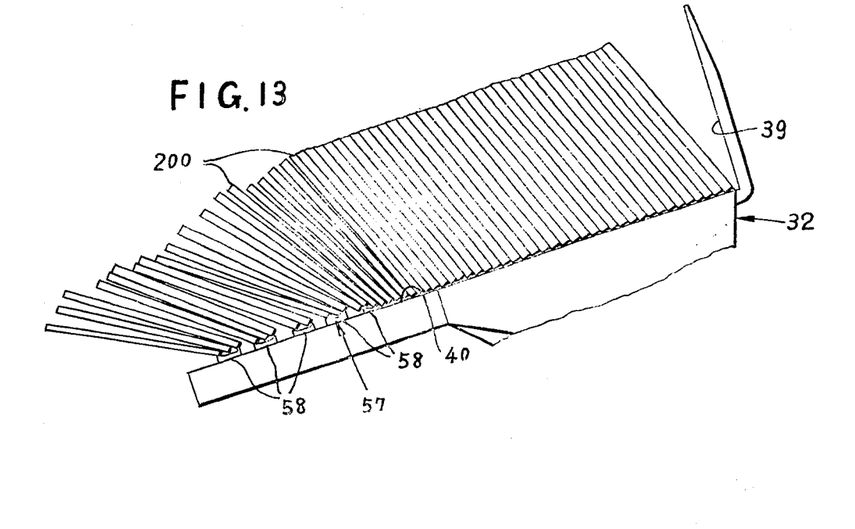
FIG. 13 is a side view of the cardboards in a condition subsequent to the condition shown in FIG. 12.

The edge clearance making device 56 is thus used for making the clearances between the edges of the cardboards. Firstly, the pantograph devices 57 may be adjusted to a suitable height by moving the piston rod 103 relative to the cylinder 102 depending upon the total height of the cardboards 200 which will be stacked. Thus, when the reversing device 32 has reached a position whereupon the edge supporting parts 40 begin to receive some portion of the weight of the cardboards 200, such as, for example, the position 32a shown in FIG. 1, the piston rod 105 is moved relatively to the cylinder 104, and consequently, the pantograph devices 57 begin to separate from their contracted condition so as to make clearances between the lower side edges of the cardboards 200 through engagement therewith by the acting members 58. The movement of the piston rod 105 may be stopped at the time when the edge supporting parts 40 become substantially horizontal wherein clearances have been made between the lower side edges of the cardboards 200, as shown in FIG. 12. Subsequently, when the reversing device 32 is rotated further, to the position shown in FIG. 13, the cardboards 200 may be reversed in proper sequence. When the reversing device 32 is returned from the condition 32c, shown in FIG. 1, to the initial condition shown in full lines, the piston rod 105, may be moved to its initial position whereby the pantograph devices 57 are contracted to their initial conditions.

The edge clearance making device 56 may generally have an arbitrary number of pantograph devices 57, such as for example, one or three. The pantograph devices 57 may be driven by chains suitably guided by means of sprockets, both of which are not shown, instead of the wire ropes 64 and 65.

Figures 14, 15:
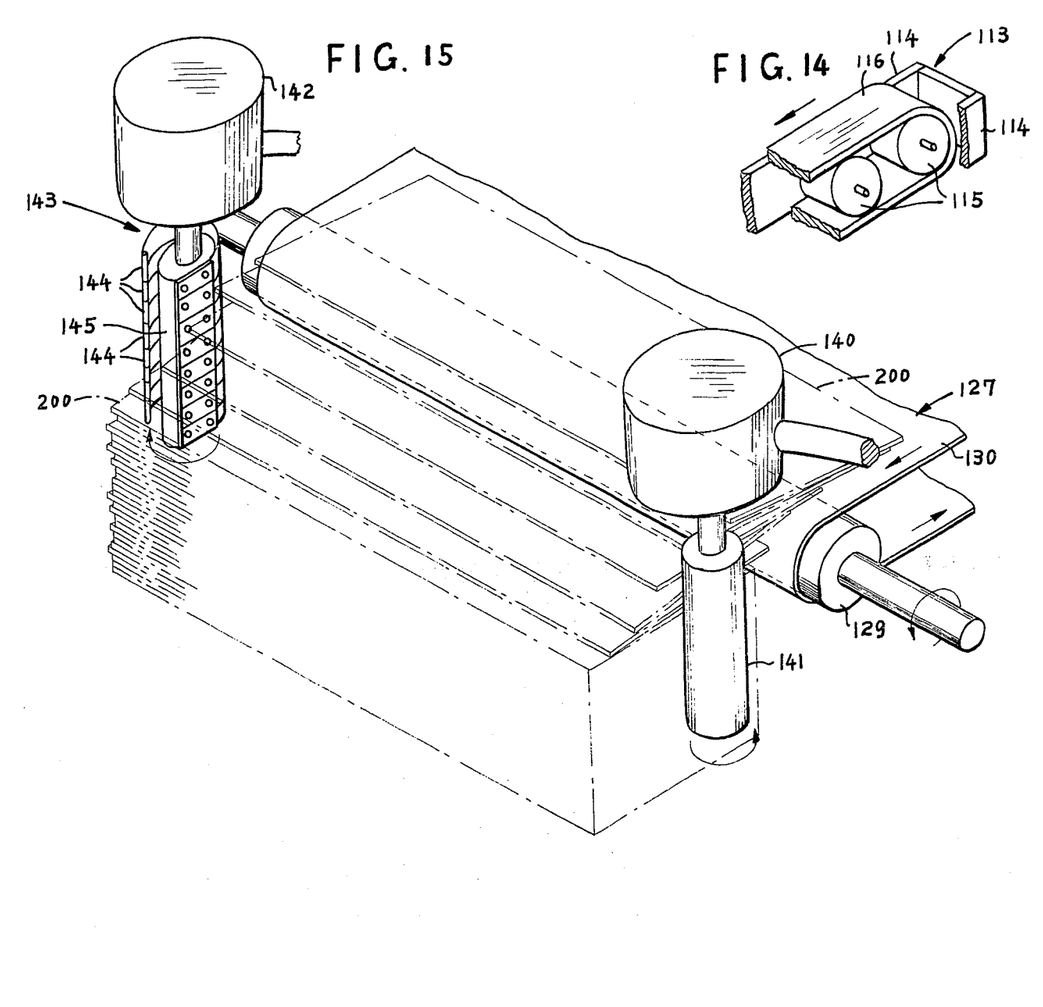
FIG. 14 is a fragmental perspective view of a conveyer utilized in the apparatus of the present invention.
FIG. 15 is a perspective view of a guide and aligning device of the present invention.

Referring now to FIGS. 1, 2 and 14, a pair of vertically extending side walls 110 are respectively fixed to the side members 21 of the base 20 at the lower ends thereof. Transverse beams 111 and 112 are fixed to the side walls 110 at both ends thereof, while a plurality of parallel conveyers 113 are in turn fixed to the beams 111 and 112 at their rear parts, the conveyers 113 being inclined such that the rear portions are lower than their front portions. The conveyors 113 comprise a pair of side plates 114, pairs of spaced rollers 115 supported by the side plates 114, and a conveyer belt 116 drivingly connecting the rollers 115. The front parts of the conveyers 113 are spaced such that the edge supporting parts 40 of the reversing device 32 are able to pass therebetween in alternate fashion therewith when the reversing device 32 is rotated from the position 32a to the position 32b and lowered from the position 32b to the position 32c as shown in FIG. 1. The rollers 115 at the rear end of the conveyers 113 are connected by an axle 118 provided with a sprocket wheel 119. Similarly, a motor 120, having a shaft 121 provided with a sprocket wheel 122, is installed upon one of the side walls 110, a chain 123 serving to connect the sprocket wheels 119 and 122 such that the conveyers 113 can be driven by the motor 120 in the direction of the arrow as seen in FIG. 1. The cardboards 200 thus reversed when the reversing device 32 is rotated from the position 32a shown in FIG. 1 as described above, will thereafter be received upon the conveyers 113, and subsequently fed downwardly by the conveyers.

Referring again to FIGS. 1 and 2, the side walls 110 have extension portions 126 which project rearwardly therefrom. Another conveyer 127 is installed upon the projecting parts 126 and comprises transverse, spaced rollers 128 and 129 and a conveyer belt 130 disposed thereabout. An axle 131, provided with a sprocket wheel 132, projects from roller 128 while another sprocket wheel 133 is installed upon shaft 121. A chain 134 is installed around the sprocket wheels 132 and 133 so that the conveyer 127 is driven by the motor 120 in the direction of the arrow as seen in FIG. 1. A transverse, vertically extending frame 135 is fixed to the projecting parts 126 at both ends thereof, a pair of laterally spaced, downwardly projecting restricting members 136 being attached to the front of frame 135. The lower end of each restricting member 136 is positioned above the upper surface of the conveyer belt 130, so that when the cardboards 200, fed by the conveyers 113, are received by the conveyer 127, the cardboards 200 become stacked with their forward edges contacting the restricting members 136. They may then be fed by means of the conveyer 127, the lower ones thereof passing through the space between the lower ends of the restricting members 136 and the upper surface of the conveyer belt 130. Therefore, although the cardboards 200 are intermittently reversed by the reversing device 32, it is possible that the cardboards 200 are able to be fed continuously by the conveyer 127. The restricting members 136 also enable the total length of the apparatus of this invention to be short, because of the cardboards 200 being continuously fed by the conveyer 127. If necessary, the restricting members 136 may be constructed so as to be vertically adjustable. The cardboards 200 passing between the restricting members 136 and the conveyer 130 are fed in the condition wherein they partly overlap each other so as to avoid the transportation of a single cardboard alone whereby useable conveyer space is wasted.

Referring now to FIGS. 1, 2 and 15, another motor 140, supported by one of the projecting parts 126 at the rear portion thereof, is provided for driving a cylindrical guide device 141 in the direction of the arrow as shown in FIG. 15. Still another motor 142, supported by the other one of the projecting parts 126 at the rear portion thereof, is provided for driving an aligning device generally indicated by the reference character 143 in the direction of the arrow shown in FIG. 15. The aligning device 143 includes a vertical array of elastic members 144 fixed to a vertically disposed control member 145 driven by the motor 142. The elastic members 144 are spiral-shaped so as to contact the side edges of the cardboards 200 which are leaving the conveyer 127 so as to press them toward the guide device 141 independently of each other, the cardboards 200 therefore being aligned with each other. The elastic members 144 are able to further convey the cardboards 200 by the rotation thereof, so that the cardboards 200 are able to be fed to and stacked upon a processing machine 201.

The apparatus described above has a number of advantages, particularly the fact that the apparatus makes possible the automatic reversal and supply of cardboards from a stocked condition to machines for making cartons therefrom. The feeding of the cardboards can be continuously accomplished in proper sequence, and thus, a great deal of labor and cost for supplying the cardboards can be eliminated.

In the foregoing, the apparatus for supplying of cardboards has been described, but the apparatus can of course be available for supplying other thin, flat articles such as, for example, plywood, metal plates, or the like.

The foregoing is of course considered as illustrative only of the principles of the invention. Obviously, numerous modifications and variations of the present invention are possible in light of the above teachings. For example, the edge clearance making device may be composed of a plurality of rollers having roughened surfaces, and may be positioned adjacent the edge supporting parts of the reversing device so that the driving device of the rollers is able to drive the upper roller faster than the lower rollers (in the above condition) when the reversing device reverses the cardboards, so that the lower side edges of the cardboards contacting the upper roller will be separated when the clearances are made due to the rollers moving at different speeds. Furthermore, the reversing device may be composed of one bottom surface supporting part having a large width and one edge supporting part installed upon the edge clearance making device and having the same width as the bottom surface supporting part, wherein the cardboards after reversing are fed by sliding along the edge supporting part to a conveyer similar to the conveyer shown in FIG. 1. In this case, intermediate conveyers, such as, for example, the conveyers 113, are not necessary. It is to be understood therefore, that within the scope of the appended claims, the present invention may be practiced otherwise than as specifically described herein.

What is claimed as new and desired to be secured by Letters Patent of the United States is:

1. An apparatus for supplying thin, flat articles comprising:

reversing means for reversing the direction toward which said articles face while in a piled condition; and clearance making means for making at least one clearance space between a pair of side edges of said articles while said articles are being reversed, said clearance making means comprising at least one pantograph device having acting members for engaging said side edges of said articles and linkage means for connecting said acting members, said pantograph device stretching from a contracted condition to a separated condition while said articles are being reversed.

2. An apparatus as set forth in claim 1 wherein the actuating position of said clearance making means is movably adjustable relative to said reversing means.

3. An apparatus for supplying thin, flat articles comprising:

reversing means for reversing the direction toward which said articles face while in a piled condition; and clearance making means for making at least one clearance space between a pair of side edges of said articles while said articles are being reversed, wherein said clearance making means comprises a plurality of pantograph devices and flexible driving members, each of said pantograph devices having acting members for engaging said side edges of said articles and linkage means for connecting said acting members, all of said pantograph devices being moved and separated the same distance relative to said reversing means, and contracted by said flexible driving members at the same time.

4. An apparatus for supplying thin, flat articles comprising:

pivotable reversing means, including at least one bottom surface supporting part and at least one edge supporting part, for reversing said articles from an initial piled condition upon said bottom surface supporting part to a condition wherein said articles face in a direction opposite that in which said articles faced while in said initial condition as a result of being pivoted about the respective lower side edges supported upon said edge supporting part; and clearance making means movably associated with said edge supporting part for providing a plurality of movements to said side edges of said articles along said edge supporting part at substantially the same time thereby making a plurality of clearance spaces between said side edges of said articles while said articles become substantially vertically oriented and begin to be reversed by said reversing means, wherein said clearance making means comprises a plurality of acting members disposed along said edge supporting part at different distances from said bottom supporting part, respectively, for engaging said lower side edges of said articles and being movable along said edge supporting part in a direction away from said bottom supporting part so as to enlarge the respective distances between said articles.

5. Apparatus as set forth in claim 4 wherein the actuating position of said clearance making means is movably adjustable relative to said edge supporting part.

6. Apparatus as set forth in claim 4 wherein said clearance making means comprises at least one pantograph device which includes said acting members and linkage means for interconnecting said acting members, said pantograph device being capable of elongation from a contracted condition to an expanded condition while said articles are substantially vertically oriented and begin to be reversed.

* * * * *